(12) United States Patent
Agner

(10) Patent No.: US 6,336,880 B1
(45) Date of Patent: Jan. 8, 2002

(54) CONTROL DEVICE FOR CONTINUOUSLY VARIABLE TRANSMISSIONS

(75) Inventor: Ivo Agner, Bad Homburg (DE)

(73) Assignee: LuK Lamellen und Kupplungsbau GmbH, Buhl/Baden (DE)

( * ) Notice: Subject to any disclaimer, the term of this patent is extended or adjusted under 35 U.S.C. 154(b) by 0 days.

(21) Appl. No.: 09/571,108

(22) Filed: May 15, 2000

(30) Foreign Application Priority Data

May 14, 1999 (DE) .......................... 199 22 232

(51) Int. Cl.[7] .......................... F16H 59/00; F16H 63/00
(52) U.S. Cl. .......................... 474/28; 474/18
(58) Field of Search .......................... 474/28, 18, 69, 474/45, 46, 48

(56) References Cited

U.S. PATENT DOCUMENTS

| | | | | |
|---|---|---|---|---|
| 4,229,988 A | * | 10/1980 | Rattunde | 474/28 |
| 4,669,336 A | * | 6/1987 | Okada et al. | 477/45 X |
| 4,714,451 A | * | 12/1987 | Yoshida et al. | 474/28 |
| 4,841,814 A | * | 6/1989 | Satoh | 477/45 |
| 5,169,365 A | * | 12/1992 | Friedmann | 474/18 |
| 5,217,412 A | * | 6/1993 | Indlekofer et al. | 474/28 X |
| 5,279,523 A | * | 1/1994 | Schonnenbeck | 474/28 |
| 5,725,447 A | * | 3/1998 | Friedmann et al. | 474/18 |
| 6,129,188 A | * | 10/2000 | Friedmann et al. | 192/3.58 |

FOREIGN PATENT DOCUMENTS

| | | | |
|---|---|---|---|
| DE | 195 46 293 | 6/1996 | |
| DE | 199 09 348 A 1 | 9/1999 | |
| EP | 291272 | * 11/1988 | ........ 474/3 ....... |

* cited by examiner

*Primary Examiner*—David Fenstermacher
*Assistant Examiner*—Marcus Charles
(74) *Attorney, Agent, or Firm*—Darby & Darby

(57) ABSTRACT

In the hydraulic control device a pressure-reducing valve (MF) is used to produce the belt-tightening pressure for the two pairs of disks (SSA, SSB) of a cone-pulley transmission, while the function of shifting the transmission ratio is performed by a ratio-shifting valve device ($DBV_13$) that adds pressure fluid to one and simultaneously removes pressure fluid from the other of the pairs of conical disks. The pressure-reducing valve and the ratio-shifting valve device work in a cascade arrangement where the assurance of a sufficient belt-tightening pressure takes precedence over the ratio-shifting function.

26 Claims, 9 Drawing Sheets

CONTROL DEVICE FOR CONTINUOUSLY VARIABLE TRANSMISSIONS

BACKGROUND OF THE INVENTION

The invention relates to a control device for a continuously variable transmission (CVT) that is based on the dual-piston principle.

The control of a continuously variable transmission based on the dual-piston principle is known, e.g., from the publication DE 195 46 293 A1. Continuously variable transmissions are cone-pulley transmissions that can be shifted within a continuous (step-free) range of transmission ratios. They have pairs of conical disks, i.e., one pair each on the input and output side of the transmission, with an endless chain-belt device making a torque-transmitting connection between the pairs of conical disks. More specifically, the continuously variable transmission according to FIG. 1 essentially consists of a disk pair SSA that is rotationally locked to a torque-input shaft 20 and a disk pair SSB that is rotationally locked to an output shaft 21 of the transmission. Each of the two disk pairs comprises an axially displaceable disk and an axially fixed disk. An endless chain-belt device 22 transmits torque from the disk pair of one shaft to the disk pair of the other.

The disk pair SSA on the input shaft 20 can be axially tightened against the chain-belt device 22 by a first piston/cylinder unit 23. In analogous manner, the disk pair SSB on the output shaft 21 can be axially tightened against the chain-belt device 22 by a second piston/cylinder unit 24.

Third and fourth piston/cylinder units 25 and 26, serving to shift the ratio of the transmission, are arranged to work in parallel, respectively, with the first piston/cylinder unit 23 on the input shaft 20 and the second piston/cylinder unit 24 on the output shaft 21. The desired transmission ratio is set or changed by simultaneously adding pressure fluid to one and removing pressure fluid from the other of the pressure chambers of the third and fourth piston/cylinder units 25 and 26, respectively. This is accomplished by connecting the pressure chambers either to a pressure-medium pump or to a drain conduit as needed in each case. In other words, a change in the transmission ratio is effected by adding pressure medium to one chamber and thereby expanding its volume while, at the same time, draining the other chamber at least partially of pressure medium and thereby reducing its volume. The respective pressurizing and draining of the pressure chambers occurs through a valve 1 as illustrated, e.g., also in FIG. 3 of the aforementioned publication DE 195 46 293 A1. The valve 1 has different ports, of which the port 2 is connected to a pressure-fluid pump (not shown). Port 3 of valve 1 is connected to the oil sump or reservoir tank. The third and fourth piston/cylinder units 25, 26 of the disk pairs SSA, SSB are connected to the valve 1 through ports 4 and 5 (conduits L1 and L2). Port 6 serves to control the valve 1 by means of a biasing pressure in pressure chamber 7. The biasing pressure in pressure chamber 7 can be governed by a proportional valve (not shown).

The slide piston 8 of the valve 1 can be configured with a smaller cross-section in a portion 9 and a larger cross-section in a portion 10. The corresponding bore widths inside the valve housing are dimensioned accordingly, i.e., differently for the respective portions 9 and 10 of the slide piston 8. In addition, the slide piston 8 can have a portion with an axial channel 11 that has a radially directed opening at a location 12. An internal piston 13 is arranged so that it can move inside the axial channel 11.

A plurality of forces are acting on the slide piston 8 and, according to their sum total, can produce a resultant force that pushes the slide piston 8 either to the right or to the left. The individual forces are symbolized in FIG. 1 by the arrows F6, F4, F5 and F14.

Directed to the right and represented by arrow F6 is a force that is proportionate to both the pressure at port 6 (thus also inside the pressure chamber 7) and the cross-sectional area of the portion 9 of the slide piston 8.

Also directed to the right and represented by arrow F4 is a force that is proportionate to both the pressure at port 4 and the difference between the cross-sectional areas of the portions 9 and 10.

Directed to the left and represented by arrow F5 is a force that is nearly proportionate to the pressure at port 5 and the cross-sectional area of the axial channel 11. The pressure at port 5 communicates with the axial channel 11 through the radial opening 12. The radial opening 12 could also be designed as a hydraulic resistance element for damping the motion of the slide piston. The pressure acting in the axial channel 11 by way of the radial opening 12 is nearly the same as at port 5. This pressure exerts a rightward push against the internal piston 13 which, in turn, bears against the plug 16. The same pressure, acting on an effective area equal to the cross-section of the axial channel 11, also exerts a leftward push on the slide piston 8.

A further leftward-directed force, symbolized by arrow F14, is generated by spring 14 exerting a leftward push on the slide piston 8 and also bearing against the plug 16.

FIG. 1 shows the valve 1 in a state where the slide piston is in its midway position. The force F6 is about equal to the force F14. The portion 8a of the slide piston 8 closes off the port 2 leading to the pressure-medium pump.

Via the shutter edges 15 and 15', port 5 and port 4 are connected to port 3. Given that port 3 has a connection to the oil sump, the respective pressures at ports 5 and 4 are nearly equal and very small. Consequently, the forces F5 and F4, which have opposite directions and nearly cancel each other, are likewise very small. With the pressure being equal at ports 4 and 5, no resultant displacing force is applied to the piston/cylinder units 25, 26 through the conduits L1, L2.

If the force F6 is greater than the force F14, slide piston 8 will move to the right. The connection between ports 5 and 3 is interrupted. Port 2 becomes connected to port 5. An in-flow of pressure medium occurs, whereby the pressure at port 5 is increased. At the same time, the shutter edge 15' opens the connection from port 4 to port 3 and thus to the oil sump. This allows the pressure medium to escape to the sump. Consequently, the pressure at port 4, and thus the force F4, is small, i.e., nearly zero. As the pressure rises at port 5, the force F5 will keep increasing up to the point where the force F5 is equal to the difference between the forces F6 and F14 (F6 minus F14). As soon as this is the case, the slide piston 8 will stop its rightward travel. If the pressure at port 5 and, consequently, the force F5 continues to increase, the slide piston 8 will move to the left until the connection between ports 2 and 5 is interrupted and the further pressure rise is blocked. Ports 5 and 3 become connected, and the passage stays open until the pressure at port 5 has decreased to the point where the force F5 is again equal to the difference between the forces F6 and F14.

This process, which is appropriately termed pressure balancing, regulates the pressure at port 5 automatically to an amount of proportionate magnitude as the difference between the forces F6 and F14.

If the pressure at port 5 is too high, fluid is drained off as the shutter edge 15 opens the connection between ports 5 and 3, while the in-flow connection between ports 2 and 5 is blocked. If the pressure at port 5 is too low, the in-flow connection between ports 2 and 5 opens and the drain connection between ports 5 and 3 becomes closed off.

The pressure at port 5 acts on the piston/cylinder unit 26 by way of conduit L2. Conduit L1, along with the piston/cylinder unit 25 is nearly pressure-free. As a result, the loop radius at which the endless chain-belt device 22 runs on the disk pair SSB is increased, while the loop radius of the chain-belt device 22 at the disk pair SSA is decreased. The result is a transmission-ratio shift to a slower speed.

If the force F6 becomes smaller than the force F14, slide piston 8 will move to the left as a result. The connection between ports 4 and 3 is interrupted and port 2 becomes connected to port 4. An in-flow of pressure medium occurs, whereby the pressure at port 4 is increased. At the same time, the shutter edge 15 opens the connection from port 5 to port 3 and thus to the oil sump. This allows the pressure medium to escape to the sump. Consequently, the pressure at port 5, and thus the force F5, is small, i.e., nearly zero. As the pressure rises at port 4, the force F4 will keep increasing up to the point where the force F4 is equal to the difference between the forces F14 and F6 (F14 minus F6). As soon as this is the case, the slide piston 8 will stop its leftward travel. If the pressure at port 4 and, consequently, the force F4 continues to increase, the slide piston 8 will move to the right until the connection between ports 2 and 4 is interrupted and the further pressure rise is blocked. Ports 4 and 3 become connected, and the passage stays open until the pressure at port 4 has decreased to the point where the force F4 is again equal to the difference between the forces F14 and F6. Again, a process of pressure balancing is taking place, regulating the pressure at port 4 automatically to an amount of proportionate magnitude as the difference between the forces F14 and F6. If the pressure at port 4 is too high, fluid is drained off as the shutter edge 15' opens the connection between ports 4 and 3, while the in-flow connection between ports 2 and 4 is blocked. If the pressure at port 4 is too low, the in-flow connection between ports 2 and 4 opens and the fluid-draining connection between ports 4 and 3 becomes closed off. The pressure at port 4 acts on the piston/cylinder 25 unit by way of conduit L1. Conduit L2, along with the piston/cylinder unit 26 is nearly pressure-free. As a result, the loop radius at which the endless chain-belt device 22 runs on the disk pair SSA is increased, while the loop radius of the chain-belt device 22 at the disk pair SSB is decreased. The result is a transmission-ratio shift to a faster speed.

Known from DE 195 46 293 is a torque sensor that serves to generate a load-dependent (more specifically, torque-dependent) belt-tightening pressure in a continuously variable transmission. It is also known to configure a torque sensor of this kind as a valve which, through the displacement of an axially movable part of the torque sensor, closes off the connection to the reservoir tank and thereby controls the pressure in the pressure chamber in accordance with the desired amount of torque to be transmitted.

OBJECT OF THE INVENTION

The object of the present invention is to provide an improved control device for a continuously variable transmission (CVT). Specifically, the transmission to be controlled has a first disk pair SSA that is rotationally locked to an input shaft and a second disk pair SSB that is rotationally locked to an output shaft. Each of the two disk pairs has an axially movable desk and an axially fixed disk. An endless chain-belt device transmits torque between the disk pairs SSA and SSB. First and second piston/cylinder units are associated with the first and second disk pairs SSA and SSB, respectively, to produce the compressive forces that tighten the disk pairs against the chain belt. Further, third and fourth piston/cylinder units, serving to shift the ratio of the transmission, are associated with the first and second disk pairs SSA and SSB, respectively. The transmission ratio is shifted by simultaneously adding pressure fluid to one and removing pressure fluid from the other of the third and fourth piston/cylinder units.

SUMMARY OF THE INVENTION

The control device according to the invention is a system of hydraulic valves in which a pressure-reducing valve is used to produce the belt-tightening pressure for the first and second piston/cylinder units, while the function of shifting the transmission ratio is performed by a ratio-shifting valve device that adds pressure medium to one and simultaneously removes pressure medium from the other of the third and fourth piston/cylinder units. In particular, the invention provides that the pressure-reducing valve and the ratio-shifting valve device work in a cascade arrangement where an offset pressure valve directs the pump-circulated pressure medium first to the pressure-reducing valve to produce the belt-tightening pressure and subsequently, but only after the belt-tightening pressure has been established, to the ratio-shifting valve device.

The arrangement of a pressure cascade where the assurance of a sufficient amount of belt-tightening pressure takes precedence over the ratio-shifting function represents an essential advantage of the invention. The pressure-reducing valve that produces the belt-tightening pressure can be a torque sensor of the kind that is described in the German patent application DE 198 12 033 A1 which, by reference, is hereby expressly incorporated in the present disclosure. Giving first priority to assuring the required level of belt-tightening pressure protects against the risk of chain-belt slippage even in case of a possible leak in the belt-tightening system. The ratio-shifting function is performed only after the required level of belt-tightening pressure has been reached. In the possible case of higher than normal leakages in the hydraulic system, this means that the shifting function has to be performed with a reduced supply of pressure medium, i.e., ratio-shifting will be slower. If the priorities were reversed, i.e., if the ratio-shifting function had first priority, the transmission could suffer damage if ratios were shifted too fast, because the torque sensor generating the belt-tightening force would receive no pressure fluid and, therefore, the chain belt would slip. Thus, if the ratio-shifting function were given precedence over the belt-tightening function, special measures would be necessary to put limits on how fast the ratio could be shifted and thereby prevent slippage, taking the possibility of additional leakages into account.

In an advantageous embodiment of the invention, the offset pressure valve has a slide piston on which a counter-force, e.g., the force of a compression spring pushing against the slide piston, and the belt-tightening pressure together hold equilibrium against the pump pressure. Thus, the pump pressure that is present at the connected input ports of the offset pressure valve and the pressure-reducing valve is regulated at a pressure level that exceeds the belt-tightening pressure produced by the pressure-reducing valve by at least an amount of offset pressure.

In the foregoing arrangement, it is advantageous to provide a check valve in the conduit that connects the input ports of the offset pressure valve and the pressure-reducing valve. The check valve is oriented so that it is held open and allows the passage of pressure medium when the pressure at the input port of the offset pressure valve is higher than at the input port of the pressure-reducing valve.

Returning to an advantageous concept mentioned above, the pressure-reducing valve can be provided in the form of a torque sensor with a pressure compartment that is pressurized with fluid supplied by a pump. The torque sensor is arranged in the torque-flow path between a torque-input part and a torque-output part so that the torque sensor itself transmits at least part of the torque that passes from the input part to the output part. Connected to the pressure compartment is a torque-sensor valve with at least two parts that can move in relation to each other and thereby control the pressure in the pressure compartment which, in turn, controls the torque-transmitting capacity of the transmission.

In a further advantageous embodiment of the inventive device, the input ports of the pressure-reducing valve and of the offset pressure valve are connected. The pressure-reducing valve has a second port connected to the first and second piston/cylinder units, and it can also have a drain port. In particular, the pressure-reducing valve has a slide piston on which a biasing force holds equilibrium against a counterforce, e.g., a spring force, and the belt-tightening pressure that exists at the second port of the pressure-reducing valve, so that the pressure-reducing valve regulates the belt-tightening pressure as a function of the biasing force. The second port of the pressure-reducing valve is connected to a second input port of the first offset pressure valve, which admits the belt-tightening pressure to the slide piston of the first offset pressure valve. The input ports of the pressure-reducing valve and the offset pressure valve are connected so that the pressure at these ports is regulated at a level that exceeds the belt-tightening pressure by at least an offset pressure.

A variation of the foregoing embodiment is functionally identical in all of the features disclosed except for the configuration of the pressure-reducing valve which, in this case, is designed so that the biasing force and the belt-tightening pressure together hold equilibrium against the counterforce. As in the preceding embodiment, the pressure-reducing valve regulates the belt-tightening pressure as a function of the biasing force.

In combination with any of the foregoing embodiments, it is advantageous if the part of the control device that is dedicated to the ratio-shifting function is a pressure-reducing valve device to which a second offset pressure valve (VSV2) is assigned. The second offset pressure valve functions as a logic OR-gate and regulates the fluid pressure at the input port of the ratio-shifting valve at a level that exceeds the greater of the pressures existing at either of two output ports of the ratio-shifting valve by at least an amount of offset pressure.

In advantageous embodiments of the invention, the ratio-shifting valve device of the foregoing description consists of either a single valve unit or a plurality, preferably a pair, of valve units. In embodiments of the device that use two valve units, the latter can preferably be controlled either by one common biasing force or by two separate biasing forces.

In all of the foregoing embodiments, any of the counterforces as well as biasing forces are generated preferably by mechanical, hydraulic or electrical means.

In a particularly favorable arrangement, the ratio-shifting valve device is constituted of two pressure-limiting valves (DBV1, DBV2) whose input ports are connected to the output port of the offset pressure valve (VSV). The output port of the first of the two pressure limiting valves (DBV1) is connected to the fourth piston/cylinder unit, i.e., to the second disk pair (SSB), while the output port of the second pressure limiting valve (DBV2) is connected to the third piston/cylinder unit, i.e., to the first disk pair (SSA). Each of the two pressure limiting valves has a slide piston. Within its respective valve housing, each slide piston will always seek a position where the forces acting on the slide piston are in equilibrium with each other. In each of the two pressure-limiting valves DBV1 and DBV2, the respective forces in equilibrium are the counterforce, the force generated by the pressure at the output, and a biasing force introduced through the pressure at a bias-pressure port of the respective pressure-limiting valve. Governed by the respective biasing forces, the first pressure limiting valve (DBV1) allows an outflow of pressure medium from its output port to the drain while the second pressure limiting valve (DBV2) directs an inflow of pressure medium from its input port to its output port, and vice versa. At the cross-over point where the pressure limiting valves (DBV1, DBV2) reverse their respective flow directions, the regulation is such that it will generate approximately the same, preferably low pressure levels at the output ports of the pressure-limiting valves.

Advantageous versions of the preceding embodiment use either a common biasing force controlling both the first and second pressure limiting valve or, alternatively, two separate biasing forces for the first and second pressure limiting valves, respectively. Further in the preceding embodiment, the one or more biasing forces as well as the counterforces can be mechanically, hydraulically and electrically generated forces.

Instead of using two pressure-limiting valves, several advantageous embodiments will now be described in which the functions of the two pressure-limiting valves (DBV1, DBV2) of the ratio-shifting valve device are incorporated in a single pressure-limiting valve unit with an input port that is connected to the output port of the offset pressure valve, first and second output ports that are connected to the fourth and third piston/cylinder units, respectively, third and fourth output ports connected to a drain, a slide piston subjected to a counterforce, a pressure force caused by a pressure at the first output port working against a pressure at the second output port, and a biasing force.

In a first advantageous embodiment of a single pressure-limiting valve unit, the pressure at the first output port is communicated through first radial and axial passages in the slide piston to a first cylinder compartment containing a first internal piston seated against the valve housing. Analogously, the pressure at the second output port is communicated through second radial and axial passages in the slide piston to a second cylinder compartment containing a second internal piston seated against the valve housing. In this first embodiment of a single pressure-limiting valve unit, it is advantageous to provide a mechanical retaining device that holds the second internal piston essentially in an axially fixed position in relation to the valve housing.

In a second advantageous embodiment of a single pressure-limiting valve unit, the pressure at the first output port acts against the surface area of a first step of the slide piston, and the pressure at the second output port acts against the surface area of a second step of the slide piston.

In a third advantageous embodiment of a single pressure-limiting valve unit, the pressure at the first output port is communicated through a passage opening in the piston to an axial channel in the slide piston containing an internal piston seated against the valve housing, while the pressure at the second output port acts against the surface area of a step of the slide piston.

In each of the three preceding embodiments, but with the bias-control function suitably modified, the first and second output ports could be exchanged so that the first output port leads to the third piston/cylinder unit and the second output port leads to the fourth piston/cylinder unit.

In any of the preceding embodiments of single pressure-limiting valve units, the counterforce and the biasing force can be generated mechanically, hydraulically, or electrically.

In any of the embodiments of the present invention, it is advantageous if the ratio-shifting valve device has shutter edges performing a pressure-regulating function and other shutter edges performing a switching function between a first state where pressure regulation takes place at the first output port while the second output port is connected to the drain, and a second state where pressure regulation takes place at the second output port while the first output port is connected to the drain. As a part of the same advantageous concept, when the ratio-shifting valve device is in a midway condition, the first and second output port are both connected to the drain.

The novel features that are considered as characteristic of the invention are set forth in particular in the appended claims. The improved apparatus itself, however, both in its construction and its mode of operation, together with additional features and advantages thereof, will be best understood upon perusal of the following detailed description of certain presently preferred specific embodiment with reference to the accompanying drawing.

DETAILED DESCRIPTION OF THE INVENTION

The present invention of a control device for continuously variable transmissions working under the dual-piston principle is based in essence on the concept of using a pressure-reducing valve with a separate offset pressure valve to supply the belt-tightening pressure, and on the concept of using a pressure cascade in which the belt-tightening pressure of the pressure-reducing valve takes precedence over the pressure supply to a valve arrangement preforming the transmission-ratio shifting function.

Figure 2:
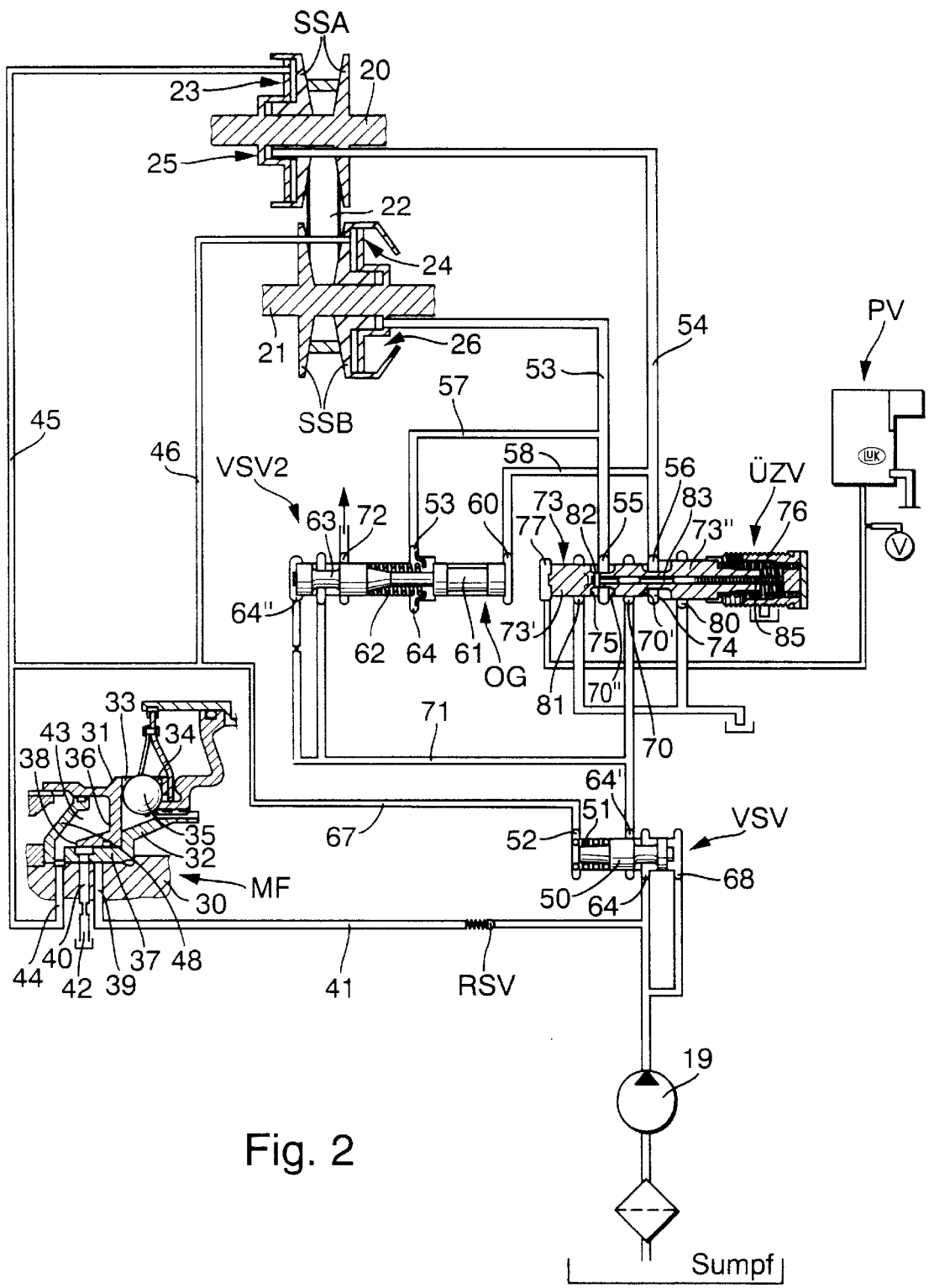
FIG. 2 represents a schematic diagram of the inventive control device for a continuously variable transmission with a pressure-reducing valve in the form of a torque sensor.

According to FIG. 2, the torque sensor MF (known per se) is used as pressure-reducing valve. The associated offset pressure valve is identified as VSV. Arranged downstream of the offset pressure valve is a valve device for setting the transmission ratio.

The purpose to be accomplished through the torque sensor is to keep the belt-tightening force of the disk pairs SSA, SSB against the chain belt at the minimum level required to prevent the chain belt from slipping and thereby to optimize the level of operating efficiency of the transmission.

The essential components of the torque sensor MF serving as pressure-reducing valve are the valve parts 31 and 32, which are arranged on a shaft 30 that is connected to a transmission shaft on the torque-input side of the transmission. Valve part 31 is axially movable, while valve part 32 is fixed. Each of the valve parts 31, 32 has a circular, ring-shaped portion with ramp surfaces 33, 34. Arranged between the ramp surfaces 33, 34 are roller bodies 35 causing an axial displacement of the valve part 31 to occur as a result of a relative rotation between the valve parts 31 and 32. At its inside radius, the axially movable valve part 31 has a channel 36 with a shutter edge 37. By moving the valve part 31 in the axial direction, the channel 36 can selectively connect a pressure compartment 43 with either the reservoir tank 42 or the pump 19. The pressure compartment 43 is formed between the axially movable valve part 31 and a further valve part 48, the latter being axially fixed on the shaft. The valve part 31, in addition, has a further shutter edge 38. The axial locations and the distance of the shutter edges 37 and 38 are such that in a first axial position of the valve part 31, passage 39 (connecting the pressure compartment 43 to the pump 19 by way of the conduit 41 and the check valve RSV) and passage 40 (connecting the pressure compartment 43 to the reservoir tank 42) are both closed, in a second axial position of the valve part 31, passage 39 is open and passage 40 is closed; and finally in a third axial position of the valve part 31, passage 39 is closed while passage 40 is open.

To control the pressure in the piston/cylinder units 23, 24 (generating the belt-tightening force of the disc pairs), the pressure compartment 43 is always connected to the piston/cylinder units 23 through the passage 44 (and the conduits 45, 46). As a result of using the torque sensor MF as a pressure-reducing valve, there is a direct dependency between the actual torque that is present at the torque-input side of the transmission and the pressure in the pressure compartment 43. Thus, the magnitude of the belt-tightening pressure exerted by the disk pairs SSA, SSB against the chain belt depends on the actual magnitude of the torque. If there is a sudden increase in torque on the input side, the roller bodies will push the ramp surfaces 33, 34 apart. Valve part 31 moves to the left in the axial direction, the inflow-controlling shutter edge 37 opens the passage to the pump 19, and the shutter edge 38 closes the passage 40 to the reservoir tank 42 (position 1). Because of the rapid movement of the valve part 31, a pumping effect occurs in the pressure compartment 43, which adds to the pressure of the fluid arriving from the pump 19. Consequently, in case the fluid injected by the pump 19 into the pressure compartment 43 does not cause the pressure to rise fast enough to compensate for the elastic behavior of the piston/cylinder units 23, 25, the advantage of this arrangement lies in the additional pumping action of the valve part 31 being moved by the roller bodies 35.

It is advantageous to provide a check valve RSV in the conduit 41 that leads from the pump 19 to the pressure compartment 43 by way of the passage 39 and the inflow-controlling shutter edge 37. The check valve RSV prevents fluid from being pushed back from the pressure compartment 43 towards the pump 19 where it would be lost due to leakage. The check valve allows fluid to flow only in the direction towards the torque sensor, while blocking the passage of fluid in the reverse direction, i.e., away from the torque sensor. Normally, when there is a volume flow arriving from the pump 19 and an additional volume flow is generated by the movement of valve part 31, the check valve RSV is open. It will close, however, when there is a strong and sudden increase in torque, which would cause fluid to flow in the reverse direction, i.e., towards the pump 19.

In the offset pressure valve VSV, ports 68 and 64 are pressurized by the fluid delivered from the pump 19. Slide piston 50 constantly maintains a minimum amount of offset pressure at the port 64 and thus also at the passage 39 of the torque sensor. Due to the force of spring 51, the offset pressure will exceed by a certain amount the pressure acting on the disk pairs which is supplied through conduits 45, 46 and also communicated through conduit 67 to port 52 of the offset pressure valve.

The offset pressure occurs as a result of the equilibrium of the forces acting on the slide piston 50, i.e., the spring force of spring 51, the force produced by the pressure at port 52 on the left of the valve VSV, and the force produced by the pressure at port 68 on the right side of the valve VSV. The slide piston 50 has a shutter edge that allows the pressure at port 64 to be regulated. If the forces on the left side exceed the forces on the right side, the passage that is controlled by the shutter edge is closed off. As a result of throttling the fluid flow, the pressure at port 64 is increased. If the forces on the right side exceed the forces on the left side, the passage that is controlled by the shutter edge is opened. Because of the reduced throttling action, the pressure at port 64 sinks. Due to the regulating effect of the shutter edge that occurs as a result of the equilibrium of forces, the valve VSV acts as a pressure-limiting valve that regulates the level of the offset pressure at passage 39 dependent on the magnitude of the spring force.

Given that the torque sensor MF represents a pressure-reducing valve, it is a prerequisite for best functional performance that the pressure at passage 39 be always greater than at passage 44. This condition is always met as a result of the pressure-limiting function that valve VSV performs by setting at least the amount of offset pressure.

Figure 1:
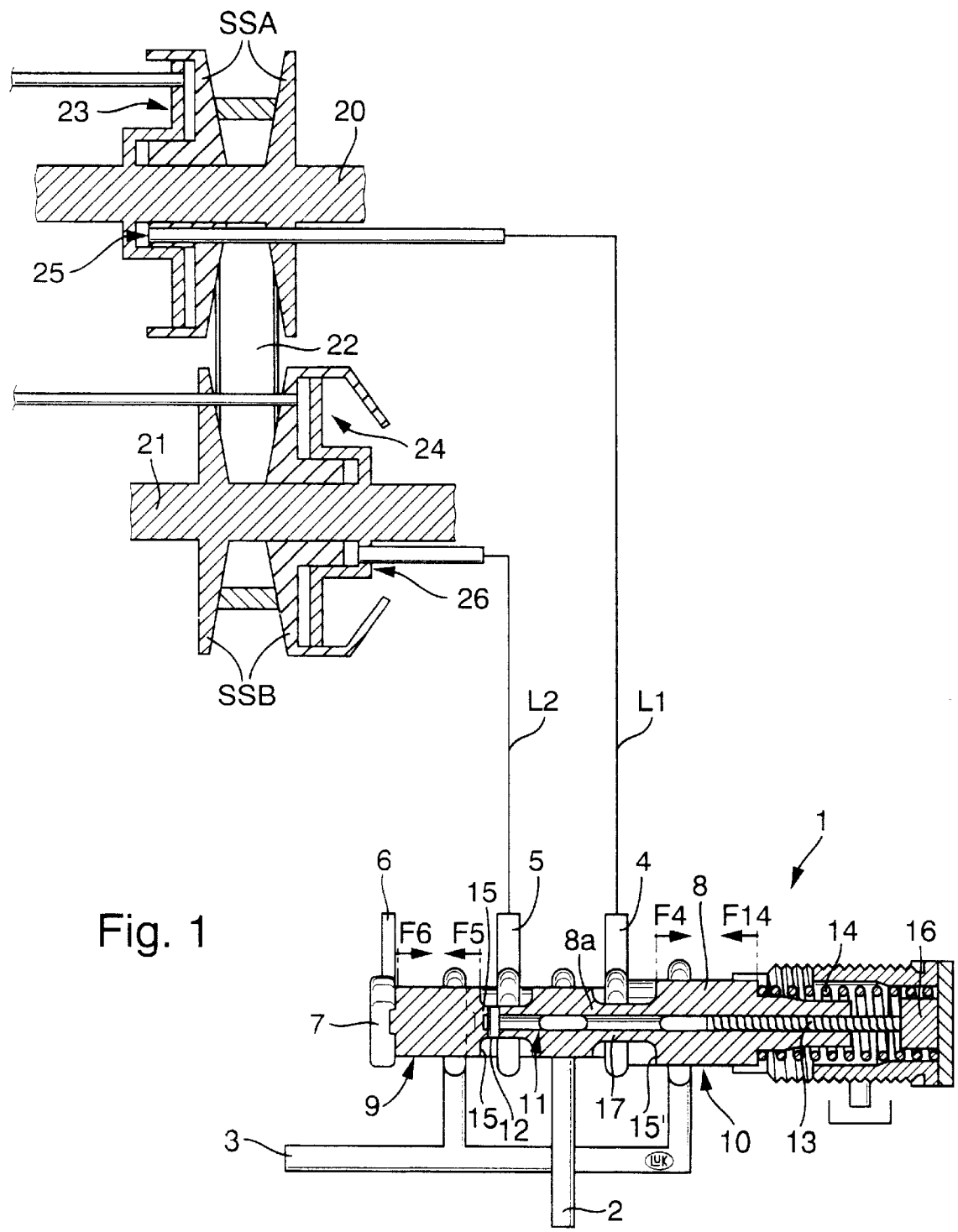
FIG. 1 represents a known valve device for controlling the piston/cylinder units by which the transmission ratio of a continuously variable transmission is regulated.

The pressure in the piston/cylinder units 25 and 26 that serve to shift the transmission ratio is applied through the conduits 53, 54, which are connected to a transmission-control valve URV at the ports 55 and 56, respectively. The pressure levels in conduits 53 and 54 are also passed on through the respective branch conduits 57 and 58 branching off from conduits 53, 54 and leading to the ports 59, 60 of a hydraulic OR-gate OG of a further offset pressure valve VSV2. The transmission-control valve URV is of a functional configuration corresponding to valve 1 of FIG. 1.

The second offset pressure valve VSV2 consists in essence of a slide piston 63 and an additional piston 61. Slide piston 63 is subjected to the leftward-directed force of a spring 62 that is seated against the housing of the second offset pressure valve VSV2 by way of a sheet-metal part 64. Piston 61 can be pushed against the end of the slide piston 63 that is surrounded by spring 62. If the OR-gate OG has a higher pressure level at port 60 (leading to disk pair SSA) than at port 59 (leading to disk pair SSB), the piston 61 will be pushed to the left so that it runs up against the slide piston 63. Accordingly, the forces of spring 62 and piston 61 (the latter force being caused by the pressure at port 60) are urging the slide piston 63 to move to the left. Based on the way the transmission-control valve URV functions, the force caused by the pressure at port 59 is near zero, thus irrelevant. Acting on the left side of slide piston 63, i.e., at the opposite end from the spring 62, is a force corresponding to the pressure level originating from port 64' of the offset pressure valve VSV and arriving through conduit 71 at port 64" of the second offset pressure valve VSV2.

If the OR-gate OG has a lower pressure level at port 60 (leading to disk pair SSA) than at port 59 (leading to disk pair SSB) the piston 61 will be pushed to the right. Accordingly, the forces acting on the slide piston 63 are the force corresponding to the pressure at port 59 and the force of spring 62. Thus, there is a selective state of equilibrium within the offset pressure valve VSV2, where either the force caused by the pressure at port 60 or the force caused by the pressure at port 59, in both cases augmented by the force of spring 62, is in equilibrium with the force caused by the pressure at port 64":

$$P_{60} \cdot A_{63} + K_{62} = P_{64"} \cdot A_{63}$$

$$P_{59} \cdot A_{63} + K_{62} = P_{64"} \cdot A_{63}$$

$$A_{63} = A_{61}$$

In the foregoing equations, A represents the cross-sectional area of piston 61 and slide piston 63. P represents the pressure at the port indicated by the respective subscript, and K represents the force of the spring.

If the force produced by the pressure at port 64" becomes smaller than the larger of the forces produced by the pressure at either of the disk pairs SSA or SSB augmented by the spring force, the slide piston 63 will move to the left so that the shutter edge 72 will close off the outflow passage, whereby the force produced by the pressure at port 64" is increased back to the level of the force of spring 62 combined with the force generated by the pressure at either of the disk pairs SSA or SSB. Thus, the pressure at port 64" can be regulated by closing and opening the outflow shutter edge 72.

Accordingly, the input port 70 of the transmission-control valve always receives a supply of pressure that exceeds the pressure level at either output port 55 or 56 of the transmission-control valve by the amount of offset pressure that corresponds to the force of spring 62 divided by the cross-sectional area of slide piston 63.

Given that the transmission-control valve URV according to its hydraulic properties represents a pressure-reducing valve unit, it is a prerequisite for best functional performance that pressure at port 70 be always greater than at ports 55, 56. This condition is always met as a result of the pressure-limiting function performed by the valve VSV2.

Additional variations for the design of the transmission-control valve as presented in DE 195 46 293 A1, implemented either as a single valve unit or as two separate valve units, as well as the configuration of the OR-gate, implemented, e.g., with ball valves, are also applicable within the context of the present invention. The arrangement of two pressure-reducing valves as shown in the aforenamed reference can also be governed by either a single, common biasing force or by separate biasing forces. The biasing force or -forces can be mechanically, hydraulically, or electrically generated forces.

The transmission-control valve receives the aforementioned supply of pressure at port 70. The slide piston 73 has two shutter edges 74, 75 controlling passages that lead to the reservoir tank. Slide piston 73 has a left portion 73' of lesser diameter and a right portion 73" of greater diameter. The force of a spring 76 acting on the right side of the slide piston is about equal to the force of the biasing pressure acting on the left side of the slide piston through port 77. By means of a proportional valve PV, the biasing pressure can be varied within a range from zero to a maximum of, e.g., 6 bar, dependent on the current. The quotient of the spring force divided by the area of lesser diameter at the half-way point of spring travel corresponds to about one-half of the maximum value of the biasing pressure. If the force corresponding to the biasing pressure at port 77 is smaller than the force of spring 76, the slide piston 73 will be pushed to the left so that the left shutter edge 75 opens the connection leading from port 55 through port 81 to the reservoir tank. Port 70 becomes connected to port 56. As the pressure at port 56 builds up, the rightward-directed force on the slide piston 73 is increased because of the step between the diameters of the portions 73' and 73", so that the shutter edge 70' shuts off the inflow passage and shutter edge 74 opens the passage leading to the reservoir tank. A process of pressure balancing sets in between the two shutter edges. Thus, the pressure on the disk pair SSA can be set through port 56. At the set point, the force of the spring 76 is in equilibrium with the force of the biasing pressure at port 77 augmented by the force differential that is due to the area differential of the step.

$$K_{76}=P_{77''} \cdot A_{73}+P_{56} \cdot (A_{73''}-A_{73'})$$

If the force corresponding to the biasing pressure at port 77 becomes greater than the force of spring 76, the slide piston 73 is pushed to the right, whereby ports 70 and 55 become connected, causing the fluid pressure at the disk pair SSB to increase. At the same time, the connection is opened from port 56 through port 80 to the reservoir tank. By way of the radial bore 82 that connects to the central axial channel 83 of slide piston 73, the pressure of port 55 reaches the internal piston 85 that bears against the valve housing. The reaction to the pressure force against piston 85 acts in the opposite direction against the slide piston 73, so that a force corresponding to the pressure multiplied by the cross-sectional area of channel 83 pushes the slide piston 73 to the left. The combined forces of the spring 76 and the pressure in channel 83 from port 55 are in equilibrium with the force that is due to the biasing pressure at port 77.

$$K_{77}=K_{76}+K_{85}$$

$$P_{77} \cdot A_{73'}=K_{76}+P_{55} \cdot A_{85}$$

In this case, too, a pressure regulating process sets in between the inflow-controlling shutter edge 70" at port 55 on the one hand and the outflow-controlling shutter edge 75 on the other, where the equilibrium of forces establishes itself according to the foregoing equation.

The torque sensor MF and the transmission-control valve URV according to their hydraulic properties are pressure-reducing valves, i.e., they can regulate the pressure at their respective ports 44 and 55, 56 only to a lower pressure level than the pressure supplied to them at their respective ports 39 and 70. To assure that this condition is met, the two valves pre-pressurize themselves, so to speak, in that they realize a higher pressure at their respective ports 39 and 70 through the control of the valves VSV and VSV2 by way of the respective ports 52 and 59, 60 and through the respective effects of the springs 51 and 62.

At the same time, the series arrangement of the valves VSV and VSV2 establishes a pressure cascade, thereby effecting an order of priority between the hydraulic consumers. This means, that the supply pressure for the torque sensor MF in conduit 41 has to reach its required level before the valve VSV will open its shutter edge and thereby allow the lower-ranking valve pair of offset pressure valve VSV2 and pressure-reducing valve URV to receive its fluid supply and pressure regulation, respectively.

As a result of this arrangement, the lower-ranking consumers will be supplied with hydraulic fluid only after the function of the torque sensor MF has been fulfilled, i.e., the belt-tightening pressure of the cone-pulley transmission 22 has been assured by pressurizing the piston/cylinder units 23, 24. In this case, the remaining available supply is the difference between the amount of fluid delivered by the pump minus the amount consumed by the function and associated leakages of the torque sensor. The remaining amount of fluid can now be used for shifting the transmission ratio. Thus, when an increased amount of fluid is consumed to produce the belt-tightening pressure, this has the automatic effect that shifts can only occur at a slower rate. Consequently, the belt-tightening pressure cannot be put at risk by fast ratio shifts, which could cause slippage of the chain belt 22 on the disk pairs SSA, SSB and thereby lead to the destruction of the transmission. This functional order of priority is achieved by arranging the unit VSV/MF hydraulically ahead of the unit VSV2/URV.

Figure 3:
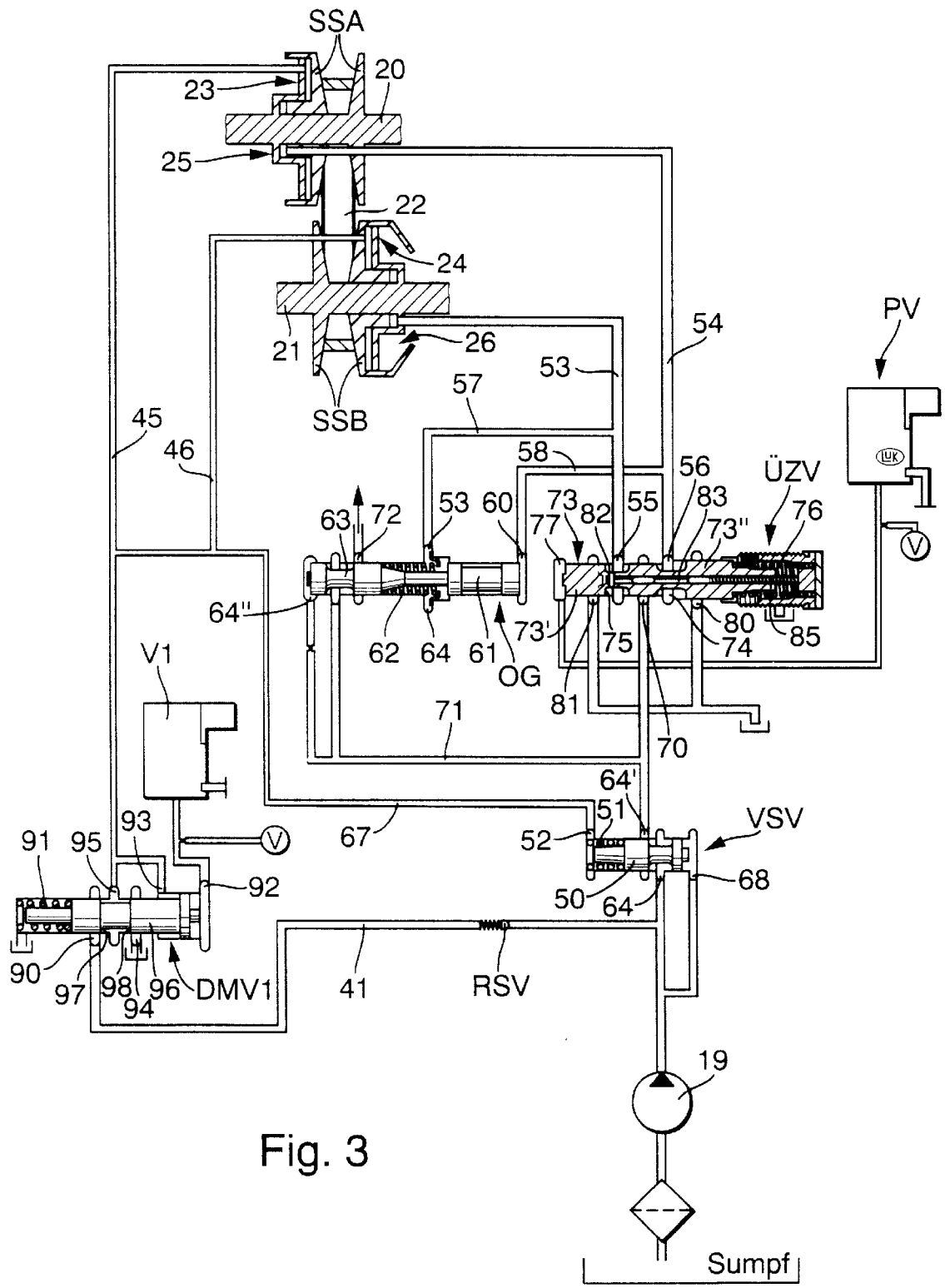
FIGS. 3 to 14 represent further developed embodiments of the invention.
Figure 4:
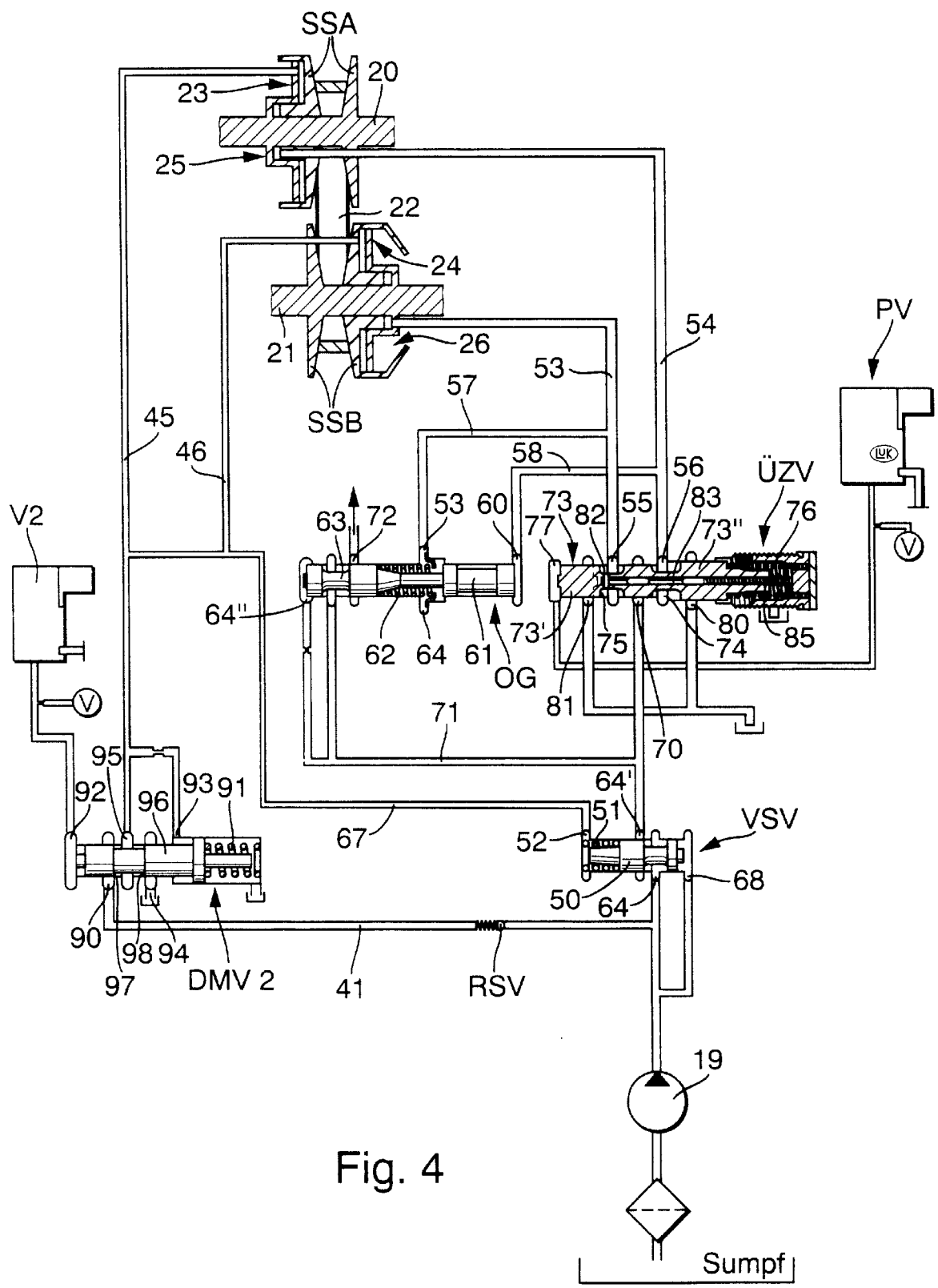

FIGS. 3 and 4 illustrate embodiments of the invention that have conventional pressure-reducing valves of the sliding piston type in place of the torque sensor of FIG. 2. Those details of FIGS. 3 and 4 that have already been discussed in the context of FIG. 2 are identified by the same reference symbols.

In both of the FIGS. 3 and 4, the pressure supplied by pump 19 is applied through conduit 41 to port 90 of the pressure-reducing valve identified as DMV1 in FIG. 3 and DMV2 in FIG. 4. The slide piston 96, depending on which way it is moved, will either allow the pump pressure to be passed on to port 95 and thus to the piston/cylinder units 23, 24 by way of conduits 45, 46, or it will open the passage from port 95 to port 94 and thereby allow the belt-tightening pressure of the piston/cylinder units 23, 24 to be connected to the reservoir tank.

In the embodiment of FIG. 3, the biasing pressure of the proportional valve V1 is applied to the right side of the slide piston 96, thus pushing the slide piston 96 to the left, while the force of spring 91 urges the slide piston 96 to the right. The pressure at port 95 is also present at port 93, pressing the slide piston 96 in the rightward direction. Accordingly, the equilibrium that governs the pressure regulation preformed by the shutter edges 97, 98 at ports 95, 93, respectively, is represented by the following equation:

$$P_{92} \cdot A_{92}=K_{91}+P_{93} \cdot A_{93}$$

With this version of controlling the pressure-reducing valve DMV1 (Biasing pressure moves slide piston 96 towards the port passage 90–95, so that the shutter edge 98 closes port 94 and the shutter edge 97 opens port 90 to a greater or lesser degree), a high biasing pressure will cause a high level of belt-tightening pressure, while a small biasing pressure will cause a lesser amount of belt-tightening pressure.

The pressure-reducing valve DMV2 of FIG. 4 works exactly the opposite way. In this case, the spring 91 urges the slide piston 96 in the leftward direction, while the biasing pressure of port 92 and the belt-tightening pressure at port 93 are exerting a rightward push on the slide piston 96. Accordingly, the equilibrium that governs the pressure regulation performed by the shutter edges 97, 98 at ports 95, 93, respectively, is represented by the following equation:

$$P_{92} \cdot A_{92}+P_{93} \cdot A_{93}=K_{91}$$

With this version of controlling the pressure-reducing valve DMV2 (Biasing pressure moves slide piston 96 towards the port passage 95-94, so that the shutter edge 97 closes port 90 and the shutter edge 98 opens port 94 to a greater or lesser degree), a high biasing pressure will cause a low level of belt-tightening pressure, while a small biasing pressure will cause a greater amount of belt-tightening pressure.

Port 94 of the pressure-reducing valve (shown as DMV1 in FIG. 3, DMV2 in FIG. 4) can be omitted if there is a constant release of pressure medium from port 95 caused by leakage in the conduit system 45, 46, 67. If more pressure medium is admitted by the shutter edge 97 than is drained off by leakage, the pressure will rise. If, on the other hand, more pressure medium is drained off by leakage than is added by way of the shutter edge 97, the pressure will decrease.

As with the arrangement of FIG. 2, the supply of belt-tightening pressure provided to the disk pairs by the pressure-reducing valve DMV1 (of FIG. 3) or DMV2 (of FIG. 4) takes precedence over the shifting of the transmission ratio.

Figure 5:
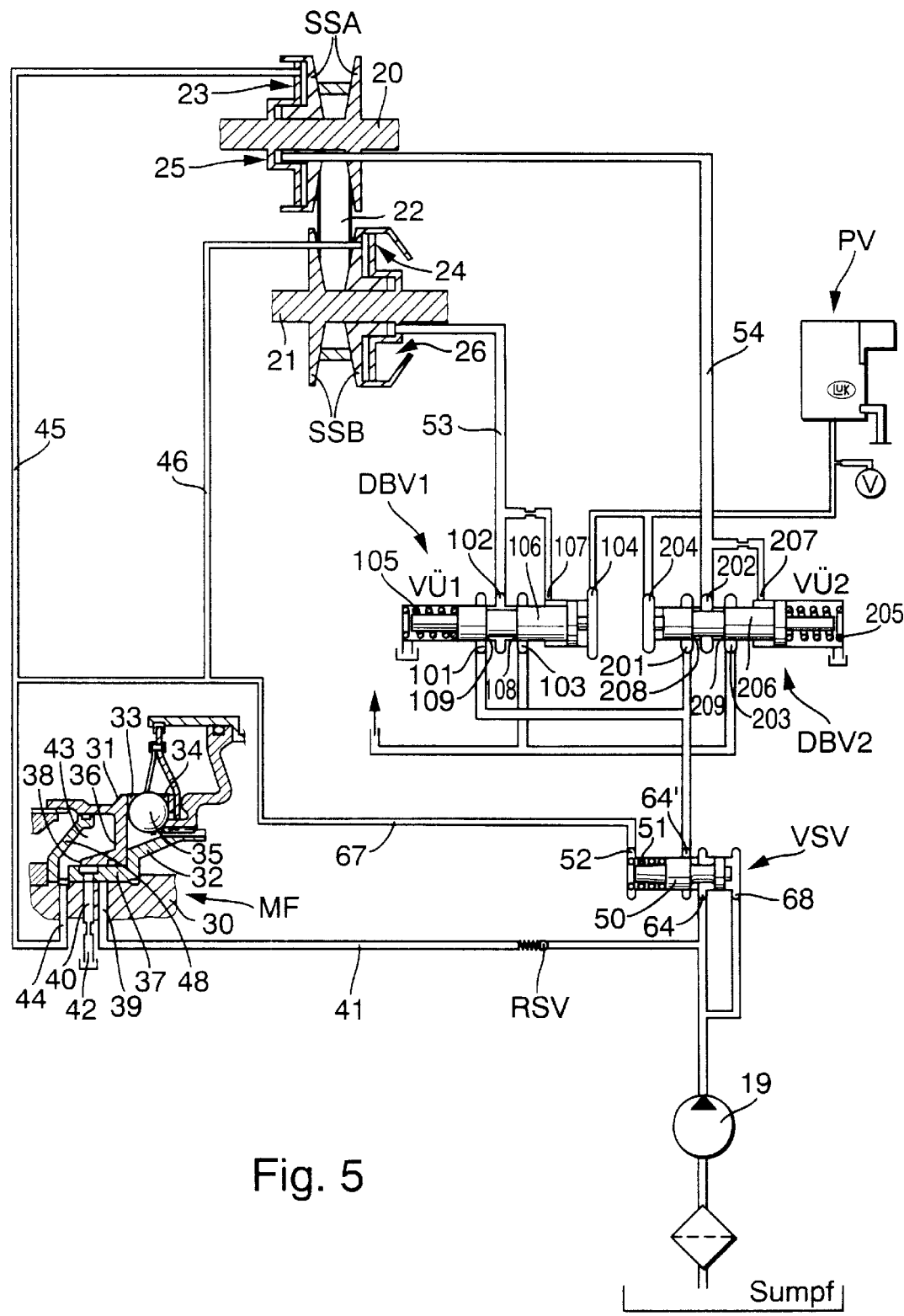
Figure 6:
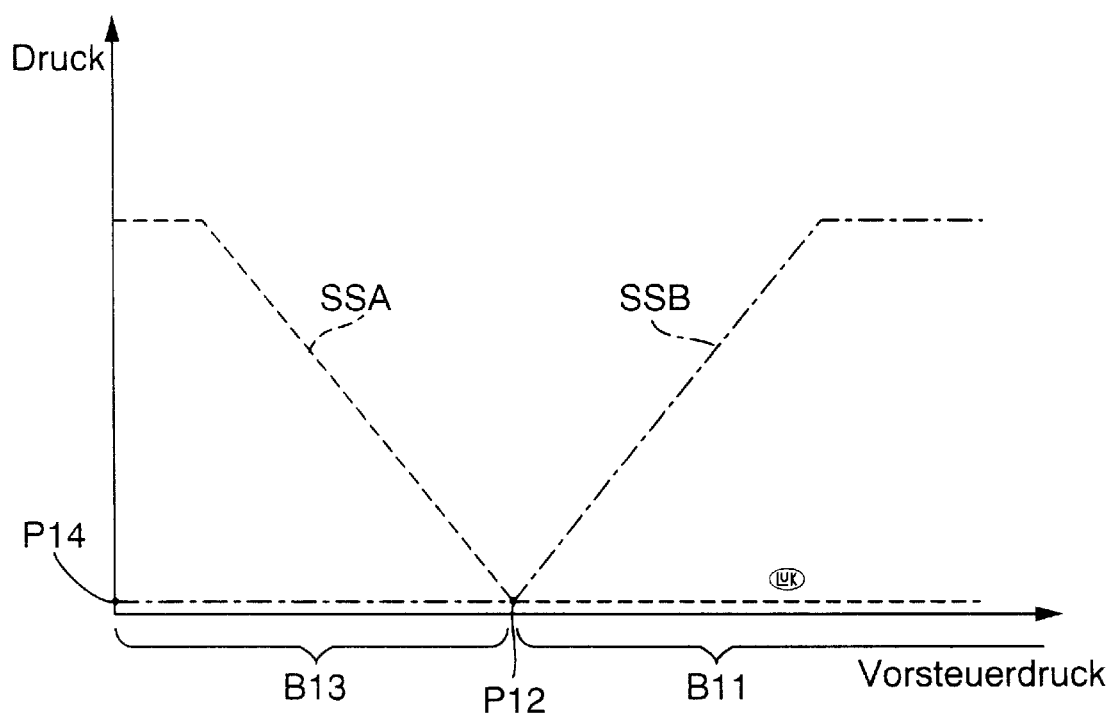

FIGS. 5 and 6 illustrate embodiments of alternative valve arrangements for the ratio-shifting function, which will be explained in the following paragraphs.

In the arrangement of FIG. 5, the ratio-shifting function is controlled by two separate pressure-limiting valves DBV1 and DBV2 with the necessary switching function already incorporated. Port 64' of the offset pressure valve VSV to which the pump pressure is applied is connected to the ports 101 and 201 of the pressure limiting valves DBV1 and DBV2. Port 102 of the pressure limiting valve DBV1 is connected to the disk pair SSB by way of conduit 53, while port 202 of the pressure limiting valve DBV2 is connected to the disk pair SSA by way of conduit 54. Ports 103 and 203 of the pressure limiting valves DBV1 and DBV2 are connected to a shared drain conduit. The biasing pressure is provided to the ports 104 and 204 of the pressure limiting valves DBV1 and DBV2, respectively, by the proportional valve PV.

Exerting a rightward push on the slide piston 206 of the pressure limiting valve DBV2 that controls the disk pair SSA are the biasing pressure at port 204 and the pressure of disk pair SSA at port 207 (the latter being connected to port 202), while the spring 205 applies a leftward force to the piston 206.

Thus, the condition for equilibrium is represented by the equation:

$$P_{204} \cdot A_{204} + P_{207} \cdot A_{207} = K_{205}$$

In other words, the pressure of disk pair SSA multiplied by the piston area at port 207 equals the force of spring 205 minus the biasing pressure multiplied by the piston area near port 204.

In analogous manner, the slide piston 106 of pressure limiting valve DBV1, which controls the disk pair SSB, is pushed leftward by the pressure of the proportional valve PV that is communicated through port 104, while the pressure of disk pair SSB at port 107 and the compressive force of the spring 105 urge the slide piston 106 to the right. The equilibrium is governed by the following condition:

$$P_{104} \cdot A_{104} = P_{107} \cdot A_{107} + K_{105}$$

In other words, the pressure of disk pair SSB multiplied by the piston area near port 107 equals the biasing pressure multiplied by the piston area near port 104 minus the force of spring 105.

Preferably, the spring forces at the right and left valve are nearly equal in magnitude. The same also applies to the dimensions of the valve pistons 106 and 206. If the force caused by the biasing pressure at port 107 of the left pressure limiting valve DBV1 is smaller than the force of the spring 105, the slide piston 106 will be pushed to the right, so that the right-hand shutter edge 108 will open the passage from disk pair SSB through ports 102 and 103 to the drain. The left-hand shutter edge 102 closes off port 101. Only after the force of the biasing pressure at port 104 has become greater than the force of the spring 105 will the right-hand shutter edge 108 close the connection to the reservoir tank at port 103 to a degree that depends on the size of the biasing pressure, while the left-hand shutter edge 109 will free the passage between ports 101 and 102, thereby allowing the build-up of pressure in the disk pair SSB. This is the operating point of the pressure regulation.

At the right-hand pressure limiting valve DBV2, if the force caused by the biasing pressure at port 204 is greater than the force of the spring 205, the slide piston 206 will always be pushed to the right, so that the right-hand shutter edge 209 will open the passage from disk pair SSA through ports 202 and 203 to the drain. The left-hand shutter edge 208 closes off the inlet port 201. If, on the other hand, the force of the biasing pressure at port 204 becomes smaller than the force of the spring 205, the connection to the reservoir tank will be closed to a degree that depends on the size of the biasing pressure, while the left-hand shutter edge 208 will free the passage between ports 201 and 202, thereby allowing the build-up of pressure in the disk pair SSA. As in the case of the left-hand pressure limiting valve DBV1, this represents again the operating point of the pressure regulation.

Based on their hydraulic function, the two valves DBV1 and DBV2 represent pressure limiting valves in that they have a strong "coverage deficit", i.e., the respective distances of the pairs of shutter edges 109, 108 and 208, 209 located on the slide pistons 106 and 206 are markedly larger than the distances of the associated shutter edges located on the valve housing. The pressure regulation occurs only by the closing and opening of the cross-sections at the shutter edges 108 and 209. The shutter edges 109 and 208 remain always open in the regulated state of the system. The small travel movements of the piston during the process of regulation are irrelevant for the change in the small hydraulic resistance at the shutter edges 109 and 208. Pressure limiting valves generate pressure by holding up the passage of the fluid stream with a shutter edge. To perform this function, they do not require a higher supply pressure. The higher pressure is generated by the valve itself, and the same pressure is also communicated to the disk pair.

In contrast to the arrangement shown in FIGS. 2 to 4, the system of FIG. 5 does not require a separate (second) offset pressure valve VSV2.

The following discussion refers to the control characteristics represented graphically in the diagram of FIG. 6.

As is representative of pressure limiting valves in general, by varying the biasing pressure in the example of the right-hand valve DBV2, the aperture at the right shutter edge 209 is increased or decreased for the purpose of varying the pressure in the disk pair SSA, while at the same time the right shutter edge 108 of the left valve DBV1 keeps the drain connection open and the inlet port 101 is kept closed by the left shutter edge 109, causing the pressure level in the disk pair SSB to be near zero. This part of the operating range is identified as B13 in FIG. 6. On the other hand, when the biasing pressure is raised to a certain point, a switch-over function occurs (point P12 in the diagram of FIG. 6), where the right shutter edge 209 of the right-hand valve DBV2 frees the passage to the reservoir tank while the inflow at port 201 is blocked by the left shutter edge, causing the pressure level of the disk pair SSA to be near zero. Meanwhile, the right shutter edge 108 of the left-hand valve DBV1 increases or decreases the aperture of the passage between ports 102 and 103 that controls the pressure build-up in the disk pair SSB. This part of the operating range is identified as B11 in FIG. 6.

As a safety feature, in case the current controlling the proportional valve PV breaks down and the biasing pressure is lost because of an electric failure, the control should handle the situation in such a way that the transmission automatically changes in the direction towards overdrive. If this were not the case, it would be possible for the transmission to be suddenly forced into underdrive while the vehicle is traveling at high speed, which could create a perilous situation. In the case where the control current is zero, the pressure at ports 104 and 202 becomes nearly zero, causing the piston of the right-hand valve DBV2 to move to the left. The left shutter edge completely opens the passage through ports 201 and 202 for the pressure supplied by the pump. The pressure builds up to its maximum level because the shutter edge 209 is closed by the spring force. Meanwhile, in the left valve DBV1, piston 106 is moved to the right. The right shutter edge opens the passage through ports 102, 103 to the reservoir tank while the left shutter edge 109 closes off the inlet port 101.

It is also conceivable to control the valves DBV1, DBV2 with separate proportional valves.

FIGS. 7 through 10 illustrate preferred embodiments of valve arrangements for the control of the transmission ratio of the disk pairs SSA and SSB.

Figure 7:
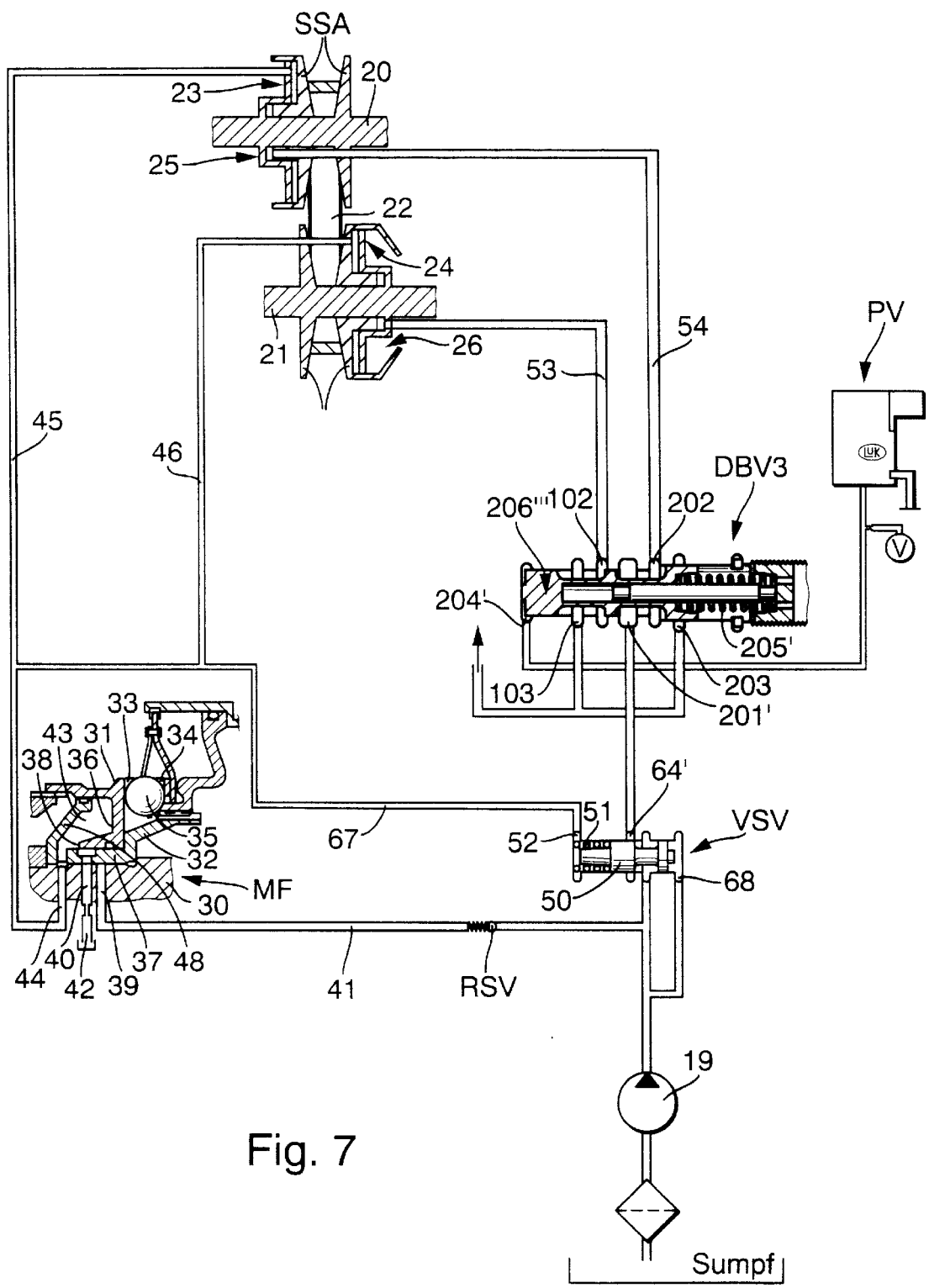
Figure 9:
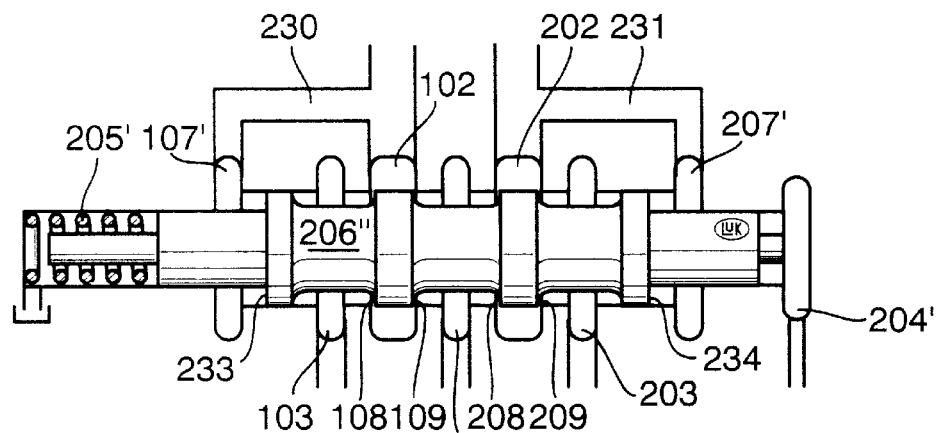
Figure 10:
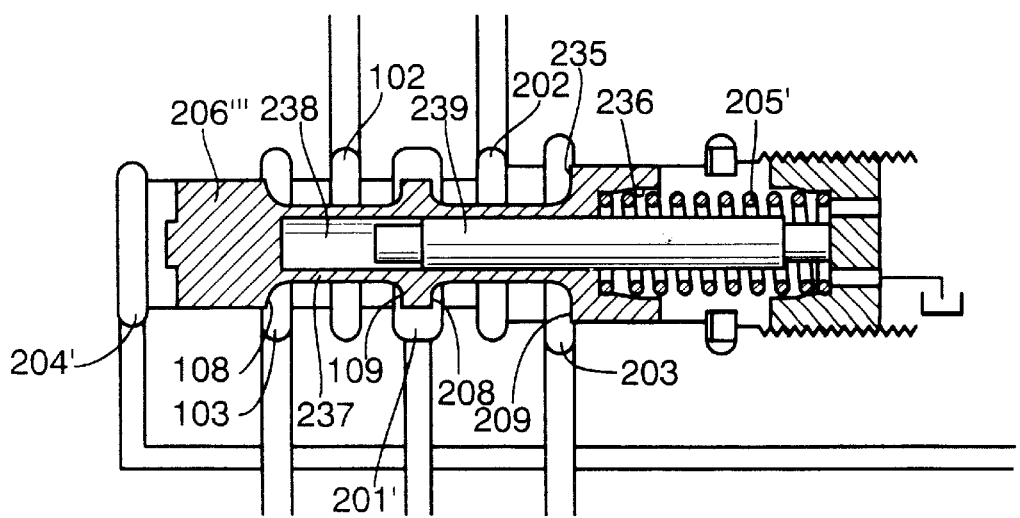

The valve of FIG. 10 corresponds to the valve DBV3 of FIG. 7. The valves of FIGS. 8 and 9 are alternative design versions of the valve DBV3 of FIG. 7.

The function of controlling the transmission ratio in the embodiments of FIGS. 7 through 10 is implemented by means of a single valve unit DBV3, while the same function is implemented with two valves DBV1 and DBV2 in the embodiment of FIG. 5. The combined functions of both valves have been integrated into the valve DBV3.

Those details that were already explained in the context of FIG. 5 will be identified by the same reference symbols in FIGS. 7 through 10.

Figure 8:
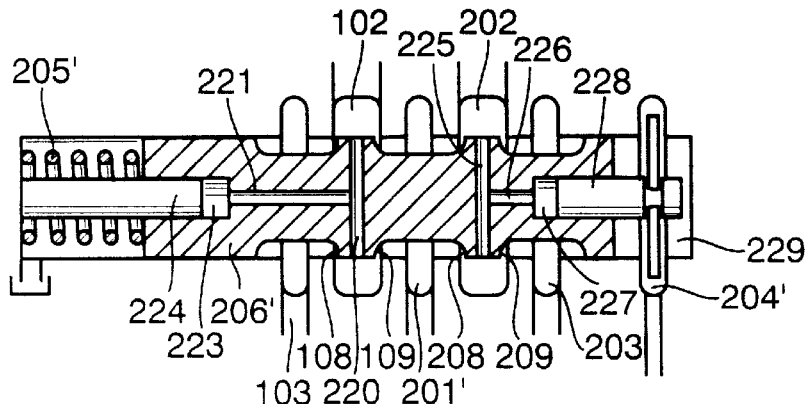

In each of the valve arrangements of FIGS. 8 through 10, the pressure supplied by the pump is applied to the inlet port 201' which corresponds to the combination of inlet ports 101 and 201 of the valve arrangement of FIG. 5. Accordingly, the biasing pressure of the proportional valve is applied to the inlet port 204' which corresponds to the input ports 104 and 204 of the valve arrangement of FIG. 5.

The routing of the pressure is realized in different ways in the valve arrangements of FIGS. 8 through 10. All of the valve arrangements, which work as pressure limiting valves, have the common feature that in their respective midway positions (as shown in FIGS. 8 through 10) the inlet shutter edges 109 and 208 as well as the regulating shutter edges 108 and 209 are in their open state allowing hydraulic fluid to flow from the pump through port 201' to ports 103 and 203, i.e., to the drain. Accordingly, fluid from ports 102 and 202 communicating with disk pairs SSA and SSB, respectively, also flows to the respective ports 103 and 203, i.e., to the drain. Consequently, when the valve is in its midway position, there is almost no pressure being generated at the disk pairs SSA and SSB.

The slide piston 206' in the arrangement of FIG. 8 has a radial passage 220 connecting to an axial passage 221 which, in turn, leads to a cylinder compartment 223 containing a piston 224. Both the piston 224 and the spring 205' are seated against the left end wall of the valve housing. The radial passage 220 leads to the port 102 and thus communicates with the disk pair SSB. The slide piston 2061 has a further radial passage 225 of analogous configuration, sharing the pressure of disk pair SSA by way of port 202 and connecting to an axial passage 226 that leads to a cylinder compartment 227 containing a piston 228. This piston 228 is axially fixed in relation to the valve housing by means of a special retaining device located in the compartment 229 that receives the biasing pressure through port 204'. Due to the axial fixation, the pressure at port 204' has no effect on the piston 228. The pressure at port 102 acting against the piston 224 by way of the radial passage 220, the axial passage 221, and the cylinder compartment 223, combined with the force of the spring 205', is urging the slide piston 206' to the right. At the same time, the pressure at port 202 acting against the piston 228 by way of the radial passage 225, the axial passage 226, and the cylinder compartment 227, combined with the biasing pressure at port 204', is urging the slide piston 206' to the left. The passages 220, 221 and 225, 226 can be designed as hydraulic resistors to dampen oscillatory movements of the slide piston 206'.

The slide piston 206" in the arrangement of FIG. 9 is lacking the radial and axial passages, cylinder compartments and pistons that have been described above in the context of FIG. 8. In the embodiment of FIG. 9, the return pressure is conducted from ports 102 and 202, respectively, to ports 107' and 207' by way of the branch conduits 230, 231. The force of spring 205', combined with the pressure at port 107', is urging the slide piston 206" to the right, while the biasing pressure at port 204', combined with the pressure at port 207', is urging the slide piston 206" to the left. This requires that the slide piston 206" be equipped with steps 233 and 234, respectively, presenting ring-shaped areas for the respective pressures at ports 107' and 207' to act against. The branch conduits 230, 231 can contain hydraulic resistors to dampen oscillatory movements of the slide piston 206".

The embodiment of FIG. 10 is particularly simple to execute in practice, because the slide piston 206" needs to have only a single step (in contrast to the two steps in FIG. 9, which present great technical difficulties) and because the fixation of the piston (corresponding to the piston 228 of FIG. 8) in relation to the valve housing is not required.

The slide piston 206''' of FIG. 10 is urged to the right by the biasing pressure at port 204' as well as the pressure of the disk pair SSA communicated through port 202 and acting against the step 235, opposed by the force of the spring 205' that is urging the slide piston leftward. The step 235 corresponds to the difference in cross-sectional area in accordance with the two different outside diameters of the slide piston 206'''. Preferably, the end of the spring 205' facing the slide piston 206''' is nested in a recess 236 in the respective end portion of the slide piston 206'''. The opposite end of the spring is seated against the valve housing.

The slide piston 206''' has a radial bore hole 237 to admit the pressure of the disk pair SSB by way of port 102 into a central axial cylinder compartment 238 containing a piston 239 that bears against the valve housing on the same side as the spring 205'. Thus, the pressure admitted to the cylinder compartment 238 will urge the slide piston 206''' to the left. The bore hole 237 can be designed as a hydraulic resistor to dampen oscillatory movements of the slide piston 206'''.

Following is a more detailed discussion of how the particularly preferred valve arrangement of FIG. 10 functions as pressure limiting valve DBV3 in the context of FIG. 7, where the connection of the valve arrangement DBV3 to the disk pairs SSA, SSB and the offset pressure valve VSV is illustrated. The different positions of the valve arrangement DBV3 will be discussed on the basis of FIGS. 11 through 14. The train of discussion is easy to retrace also for the valves of FIGS. 8 and 9, given that corresponding elements are identified by the same symbols and only the return pressure connections of ports 102 and 202 are implemented differently, as described above. The valve position of FIG. 12 corresponds to the position of FIG. 10, i.e., the midway position of the valve where the pressure on both disk pairs SSA and SSB is close to zero, because ports 102 and 202 are connected to ports 103 and 203, respectively, thus to the reservoir tank. This state of the system corresponds to the point P12 in the diagram of FIG. 6.

Figure 11:
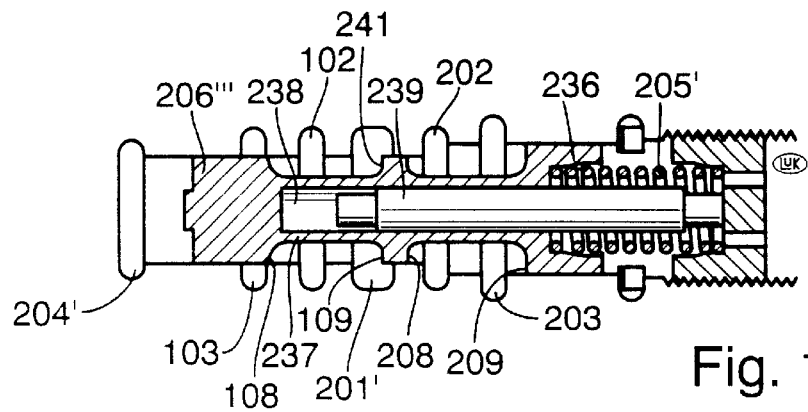
Figure 12:
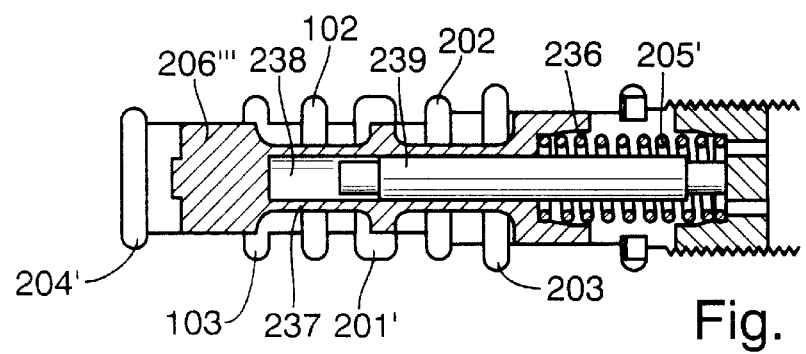

FIG. 11 shows the valve position where the pump pressure at port 201' is passed through to port 102 and thus to the disk pair SSB. The shutter edge 108 regulates the connection to port 103 leading to the drain, as the pump pressure also acts against piston 239, thereby exerting a leftward push on the slide piston 206'''. The pressure of disk pair SSA is close to zero, because the shutter edge 209 allows free passage through port 203 and thus to the drain. At the same time, the connection between ports 201' and 202 is blocked. In the diagram of FIG. 6, this state of the system corresponds to the part of the operating range identified as B11, which lies to the right of point P12. The equilibrium of forces in this operating condition is governed by the equation $$P_{204'} \cdot A_{204'} - K_{205'} = P_{102} \cdot A_{239}$$

where $P_{204'} \cdot A_{204'} - K_{205'} > 0$ and where $A_{239}$ stands for the cross-sectional area of the piston 239.

Thus, the pressure regulation of the disk pair SSB occurs at the shutter edge 108. When there is a decrease in the biasing pressure at port 204', the shutter edge 108 will allow pressure medium to pass through port 103 and thus to the drain, so that the pressure level at the disk pair SSB decreases, while the opposite occurs when there is an increase in pressure at port 204'.

Figure 13:
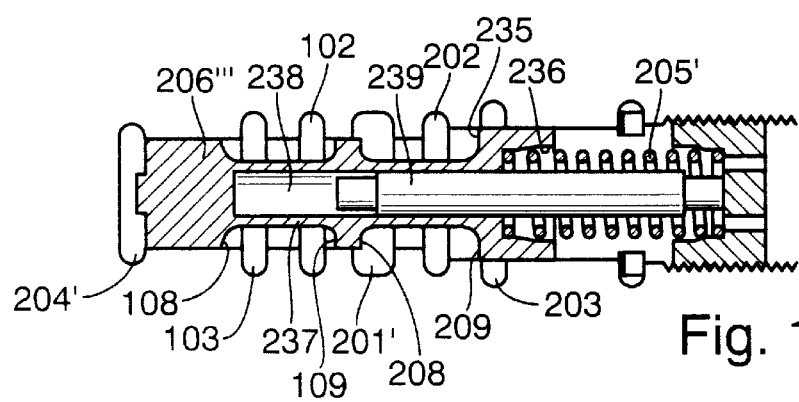

FIG. 13 shows the valve position where the pump pressure at port 201' is passed through to port 202 and thus to the disk pair SSA, while the passage through ports 102 and 103 is open, i.e., the disk pair SSB is connected to the drain so that its pressure is close to zero. This state of the system corresponds to the part of the operating range identified as B13, to the right of point P12 in the diagram of FIG. 6. The equilibrium of forces in this operating condition is governed by the equation $$K_{205'} - P_{204'} \cdot A_{204'} = P_{102} \cdot A_{235}$$

where $K_{205'} - P_{204'} \cdot A_{204'} > 0$ and where $A_{235}$ stands for the cross-sectional area presented by the step 235.

The pressure regulation of the disk pair SSA occurs at the shutter edge 209. When there is an increase in the biasing pressure at port 204', the shutter edge 209 will allow pressure medium to be drained through port 203 and thus to the reservoir tank, so that the pressure level at the disk pair SSA decreases, while the opposite occurs when there is a decrease in pressure at port 204'.

As is evident from FIGS. 11 and 13, the shutter edges 109 and 208 only perform the function of switching the fluid stream from SSB to SSA and vice versa, i.e., they have no regulating function. The pressure regulation of the disk pairs SSB and SSA occurs at the shutter edges 108 and 209, respectively.

Figure 14:
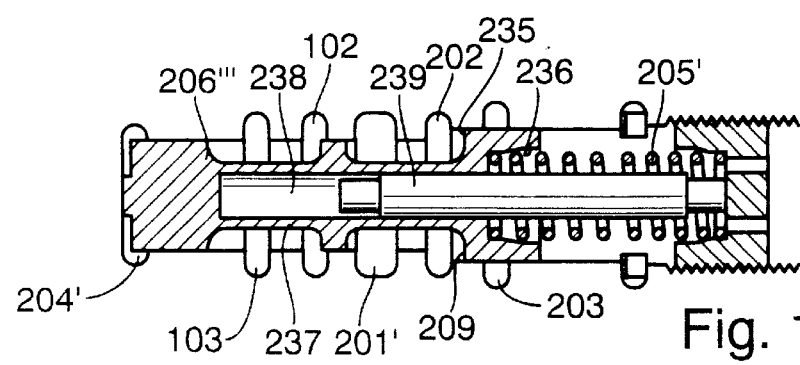

FIG. 14 shows the valve in a state where the biasing pressure at port 204' is zero. The disk pair SSA receives the full amount of the pressure entering at port 201', while the pressure level at disk pair SSB is zero (corresponding to point P14 of FIG. 6). The equilibrium of forces in this operating condition is governed by the equation $K_{205'} = P_{202} \cdot A_{235}$. As the pressure at port 202 rises against the opposing spring force $K_{205'}$, the shutter edge 209 starts to open port 203 (see FIG. 13) and thereby limits the pressure of disk pair SSA to a maximum allowable value.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the aforedescribed contribution to the art and, therefore, such adaptations should and are intended to be comprehended within the meaning and range of equivalence of the appended claims.

What is claimed is:

1. A device for controlling a continuously variable transmission, said transmission having
   a first pair of conical disks rotationally fixed to an input shaft of the transmission and a second pair of conical disks rotationally fixed to an output shaft of the transmission, each of the pairs having an axially movable disk and an axially fixed disk,
   an endless chain-belt arranged to transmit torque between the first and second pair of disks,
   a first piston/cylinder unit assigned to the first pair of disks and a second piston/cylinder unit assigned to the second pair of disks, said first and second piston/cylinder units serving to generate a belt-tightening pressure to press the first and second pairs of disks against the chain-belt,
   a third piston/cylinder unit assigned to the first pair of conical disks and a fourth piston/cylinder unit assigned to the second pair of conical disks, said third and fourth piston/cylinder units effecting a ratio change of the transmission when pressure medium is added to one and simultaneously removed from the other of the third and fourth piston/cylinder units, and
   a control valve device directing pump-circulated pressure medium to flow into the first and second piston/cylinder units, and to flow into one of the third and fourth piston/cylinder unit and simultaneously out of the other of the third and fourth piston/cylinder units,
   wherein said control valve device comprises a pressure-reducing valve to produce the belt-tightening pressure for the first and second piston/cylinder units and a ratio-shifting valve device to add pressure medium to one of the third and fourth piston/cylinder unit and simultaneously remove pressure medium from the other of the third and fourth piston/cylinder units, said pressure-reducing valve and said ratio-shifting valve device working in a cascade arrangement where at least a first offset pressure valve directs the pump-circulated pressure medium first to the pressure-reducing valve to produce the belt-tightening pressure and subsequently, but only after the belt-tightening pressure has been established, to the ratio-shifting valve device.

2. The device of claim 1, wherein the first offset pressure valve has a slide piston on which a counterforce and a force generated by the belt-tightening pressure together hold equilibrium against a force generated by the pressure medium arriving from a pump, so that a pressure existing at a first input port of the first offset pressure valve and at a first port of the pressure-reducing valve connected thereto is regulated to an input pressure level that is greater by at least an amount of offset pressure than the belt-tightening pressure produced by the pressure-reducing valve.

3. The device of claim 1, wherein
   the first port of the pressure-reducing valve is connected to the first input port of the first offset pressure valve and a second port of the pressure-reducing valve is connected to the first and second piston/cylinder units, the pressure-reducing valve can have a drain port, the pressure-reducing valve has a slide piston on which a biasing force and the belt-tightening pressure that exists at the second port of the pressure-reducing valve together hold equilibrium against a counterforce, the second port of the pressure-reducing valve is connected to a second input port of the first offset pressure valve, which admits the belt-tightening pressure to the slide piston of the first offset pressure valve, and the first port of the pressure-reducing valve is connected to the first input port of the first offset pressure valve so that a pressure existing at the first input port of the first offset pressure valve and the thereto connected first port of the pressure-reducing valve is regulated to an input pressure level that is greater by at least an amount of offset pressure than the belt-tightening pressure that is regulated by the pressure-reducing valve as a function of the biasing force.

4. The device of claim 1, wherein the first port of the pressure-reducing valve is connected to the first input port of the first offset pressure valve and a second port of the pressure-reducing valve is connected to the first and second piston/cylinder units, the pressure-reducing valve has a drain port, the pressure-reducing valve has a slide piston on which a biasing force and the belt-tightening pressure that exists at the second port of the pressure-reducing valve together hold equilibrium against a counterforce, the second port of the pressure-reducing valve is connected to a second input port of the first offset pressure valve, and the first port of the pressure-reducing valve is connected to the first input port of the first offset pressure valve so that a pressure existing at the first input port of the first offset pressure valve and the thereto connected first port of the pressure-reducing valve is regulated to an input pressure level that is greater by at least an amount of offset pressure than the belt-tightening pressure that is regulated by the pressure-reducing valve as a function of the biasing force.

5. The device of claim 1, wherein the ratio-shifting valve device is a pressure-reducing valve and wherein further a second offset pressure valve is arranged to cooperate with the ratio-shifting valve device, said second offset pressure valve functioning as a logic OR-gate and regulating an input pressure at an input port of the ratio-shifting valve device so that said input pressure exceeds the greater of the pressures existing at a first output port and a second output port of the ratio-shifting valve device by at least an amount of offset pressure.

6. The device of claim 2, further comprising a check valve arranged in a conduit connecting the first input port of the first offset pressure valve and the first port of the pressure-reducing valve, said check valve being open when the pressure medium has a higher pressure at the first input port of the first offset pressure valve than at the first port of the pressure-reducing valve.

7. The device of claim 2, wherein the pressure-reducing valve is provided in the form of a torque sensor that can be pressurized with pressure medium supplied by a pump, the torque sensor is arranged between a torque-input part and a torque-output part and has a pressure compartment that can be pressurized with pressure medium, the torque sensor can transmit at least part of a torque to be transmitted between the torque-input part and the torque-output part, and the continuously variable transmission has a torque-transmitting capacity determined by a compartment pressure existing in the pressure compartment, said compartment pressure being controllable by means of at least two parts of a torque-sensor valve that are movable in relation to each other, said torque-sensor valve being connected to the pressure compartment.

8. The device of claim 2, wherein the counterforce is from a group consisting of mechanically, hydraulically and electrically generated forces.

9. The device of claim 2, wherein the ratio-shifting valve device is constituted of a first pressure limiting valve and a second pressure limiting valve, the first and second pressure limiting valves, respectively, have first and second input ports connected to an output port of the first offset pressure valve, the first and second pressure limiting valves, respectively, have first and second output ports connected to the fourth and third piston/cylinder units, the first and second pressure limiting valves have respective first and second slide pistons acted on by respective first and second counterforces, respective first and second pressure forces generated by the pressures existing at the respective first and second output ports, and at least one biasing force generated by a biasing pressure introduced through at least one biasing-pressure port, the ratio-shifting valve device is regulated so that the first pressure limiting valve directs an outflow of pressure medium from the first output port to a first drain port while the second pressure limiting valve directs an inflow of pressure medium from the second input port to the second output port, and vice versa, and at a mid-point of operation where the first pressure limiting valve changes from outflow to inflow while the second pressure limiting valve changes from inflow to outflow, and vice versa, there are approximately identical, low levels of pressure present at the first and second output ports.

10. The device of claim 2, wherein the ratio-shifting valve device is configured as a single pressure-limiting valve unit with a valve housing, the pressure-limiting valve unit has an input port connected to an output port of the first offset pressure valve, the pressure-limiting valve unit has first and second output ports connected to the fourth and third piston/cylinder units, respectively, the pressure-limiting valve unit has third and fourth output ports connected to a drain, the pressure-limiting valve unit has a slide piston acted on by a counterforce, by a pressure force caused by a pressure at the first output port working against a pressure at the second output port, and by a biasing force, the pressure at the first output port is communicated through first radial and axial passages in the slide piston to a first cylinder compartment containing a first internal piston seated against the valve housing, the pressure at the second output port is communicated through second radial and axial passages in the slide piston to a second cylinder compartment containing a second internal piston seated against the valve housing.

11. The device of claim 2, wherein
the ratio-shifting valve device is configured as a single pressure-limiting valve unit with a valve housing,
the pressure-limiting valve unit has an input port connected to an output port of the first offset pressure valve,
the pressure-limiting valve unit has first and second output ports connected to the third and fourth piston/cylinder units, respectively,
the pressure-limiting valve unit has third and fourth output ports connected to a drain,
the pressure-limiting valve unit has a slide piston acted on by a counterforce, by a pressure force caused by a pressure at the first output port working against a pressure at the second output port, and by a biasing force,
the pressure at the first output port is communicated through first radial and axial passages in the slide piston to a first cylinder compartment containing a first internal piston seated against the valve housing,
the pressure at the second output port is communicated through second radial and axial passages in the slide piston to a second cylinder compartment containing a second internal piston seated against the valve housing.

12. The device of claim 2, wherein
the ratio-shifting valve device is configured as a single pressure-limiting valve unit with a valve housing,
the pressure-limiting valve unit has an input port connected to an output port of the first offset pressure valve,
the pressure-limiting valve unit has first and second output ports connected to the fourth and third piston/cylinder units, respectively,
the pressure-limiting valve unit has third and fourth output ports connected to a drain,
the pressure-limiting valve unit has a slide piston acted on by a counterforce, by a pressure force caused by a pressure at the first output port working against a pressure at the second output port, and by a biasing force,
the pressure at the first output port acts against the surface area of a first step of the slide piston, and
the pressure at the second output port acts against the surface area of a second step of the slide piston.

13. The device of claim 2, wherein
the ratio-shifting valve device is configured as a single pressure-limiting valve unit with a valve housing,
the pressure-limiting valve unit has an input port connected to an output port of the first offset pressure valve,
the pressure-limiting valve unit has first and second output ports connected to the third and fourth piston/cylinder units, respectively,
the pressure-limiting valve unit has third and fourth output ports connected to a drain,
the pressure-limiting valve unit has a slide piston acted on by a counterforce, by a pressure force caused by a pressure at the first output port working against a pressure at the second output port, and by a biasing force,
the pressure at the first output port acts against the surface area of a first step of the slide piston, and the pressure at the second output port acts against the surface area of a second step of the slide piston.

14. The device of claim 2, wherein
the ratio-shifting valve device is configured as a single pressure-limiting valve unit with a valve housing,
the pressure-limiting valve unit has an input port connected to an output port of the first offset pressure valve,
the pressure-limiting valve unit has first and second output ports connected to the fourth and third piston/cylinder units, respectively,
the pressure-limiting valve unit has third and fourth output ports connected to a drain,
the pressure-limiting valve unit has a bias-pressure port,
the pressure-limiting valve unit has a slide piston acted on by a counterforce, by a pressure force caused by a pressure at the first output port working against a pressure at the second output port, and by a pressure force caused by the bias pressure,
the pressure at the first output port is communicated through a passage opening in the piston to an axial channel in the slide piston containing an internal piston seated against the valve housing, and
the pressure at the second output port acts against the surface area of a step of the slide piston.

15. The device of claim 2, wherein
the ratio-shifting valve device is configured as a single pressure-limiting valve unit with a valve housing,
the pressure-limiting valve unit has an input port connected to an output port of the first offset pressure valve,
the pressure-limiting valve unit has first and second output ports connected to the third and fourth piston/cylinder units, respectively,
the pressure-limiting valve unit has third and fourth output ports connected to a drain,
the pressure-limiting valve unit has a bias-pressure port,
the pressure-limiting valve unit has a slide piston acted on by a counterforce, by a pressure force caused by a pressure at the first output port working against a pressure at the second output port, and by a pressure force caused by the bias pressure,
the pressure at the first output port is communicated through a passage opening in the piston to an axial channel in the slide piston containing an internal piston seated against the valve housing, and
the pressure at the second output port acts against the surface area of a step of the slide piston.

16. The device of claim 3, wherein the at least one biasing force is from a group consisting of mechanically, hydraulically and electrically generated forces.

17. The device of claim 5, wherein the ratio-shifting valve device is constituted by at least one valve unit.

18. The device of claim 17, wherein the ratio-shifting valve device is constituted by two valve units.

19. The device of claim 9, wherein the biasing force is a common biasing force controlling both the first and second pressure limiting valve.

20. The device of claim 9, wherein two separate biasing forces control the first and second pressure limiting valves, respectively.

21. The device of claim 9, wherein the at least one biasing force and the first and second counterforces are from a group consisting of mechanically, hydraulically and electrically generated forces.

22. The device of claim 9, wherein the ratio-shifting valve device comprises shutter edges performing a pressure-regulating function and further shutter edges performing a switching function between a first state and a second state, in the first state, pressure regulation takes place at the first output port while the second output port is connected to the drain, in the second state, pressure regulation takes place at the second output port while the first output port is connected to the drain, in an intermediate state between the first and second states, the first and second output port are both connected to the drain.

23. The device of claim 10, wherein the counterforce and the biasing force are from a group consisting of mechanically, hydraulically and electrically generated forces.

24. The device of claim 10, comprising a mechanical retaining device that holds the second internal piston essentially in an axially fixed position in relation to the valve housing.

25. The device of claim 18, wherein the two valve units can be controlled by one common biasing force.

26. The device of claim 18, wherein the two valve units can be controlled by two separate biasing forces.

* * * * *